(12) United States Patent
Bisch

(10) Patent No.: US 6,601,804 B2
(45) Date of Patent: Aug. 5, 2003

(54) PORTABLE HEADREST

(76) Inventor: Jeffrey R. Bisch, 5639 W. Camino Cielo, Santa Barbara, CA (US) 93105

( * ) Notice: Subject to any disclaimer, the term of this patent is extended or adjusted under 35 U.S.C. 154(b) by 0 days.

(21) Appl. No.: 09/880,998

(22) Filed: Jun. 12, 2001

(65) Prior Publication Data

US 2002/0185573 A1 Dec. 12, 2002

(51) Int. Cl.[7] .................................................. B68G 5/00
(52) U.S. Cl. ..................... 248/118; 248/694; 297/391; 297/397
(58) Field of Search ................................ 248/118, 694; 5/636, 640; 297/397, 399, 391, 398, 217.4; 224/201; 128/870

(56) References Cited

U.S. PATENT DOCUMENTS

| | | | | |
|---|---|---|---|---|
| 2,464,435 A | * | 3/1949 | Conradt | 297/397 |
| 4,440,443 A | * | 4/1984 | Nordskog | 297/397 |
| 5,613,736 A | * | 3/1997 | Schaked et al. | 297/397 |
| 5,868,471 A | * | 2/1999 | Graham et al. | 297/397 |
| 6,123,389 A | * | 9/2000 | O'Connor et al. | 297/397 |
| 6,234,446 B1 | * | 5/2001 | Patterson | 248/694 |
| 6,305,749 B1 | * | 10/2001 | O'Connor et al. | 297/397 |

* cited by examiner

Primary Examiner—Ramon O. Ramirez
Assistant Examiner—Tan Le
(74) Attorney, Agent, or Firm—Patrick F. Bright; Bright & Lorig, P.C.

(57) ABSTRACT

A headrest for supporting a person's head includes a back panel adapted to abuttingly engage a person's head that includes a first hinge-forming groove at each end, and two side wing members pivotally and foldably attached to the back member at or near its ends with the side wing members including an offset portion with an axle rotatable in the first hinge-forming groove.

8 Claims, 6 Drawing Sheets

PORTABLE HEADREST

This invention relates to a portable headrest that includes foldable, pivoting side wing members, and a back panel for supporting the back and sides of a person's head. Preferably, the headrest is sufficiently small/compact to fit into a briefcase, purse, backpack, or glove compartment. Preferred embodiments of the portable headrest readily attach to, and are readily detached from existing seat backs and from existing vehicle seat headrests, such as those in automobiles, trains and planes. Preferred embodiments include a slidable strap attached to the back side of the headrest, permitting slidable attachment to such existing seats and headrests.

In preferred embodiments, the two pivoting side wing members are foldably attached to the back panel near the ends of the back panel. The side wing (or side panel) members pivot to an open position at an angle to the back panel, to form supporting surfaces for the sides of a person's head, and pivot to fold substantially flat against the front side of the back panel to form another support surface for the back of a person's head. Preferably, the internal angle between the back panel and each side wing member, with the side wing members fully opened, is in the range of about 90° to about 100°, most preferably about 95°.

Preferably, the side wing members include a two-sided support panel, and are padded on one or both sides of the two-sided panel so that, when folded substantially flat against the front side of the back panel, the side wing members form a flat padded rest or support surface. Each two-sided panel preferably has a rounded contour. Padding, e.g. foam pads, is preferably attached to one or both sides of the two-sided support panel to provide one or more cushioned surfaces for a person's head. If the panel is cushioned on both sides, the side wings form a padded surface for the back of a person's head when the panel is closed, i.e. folded flat against the back panel, and a padded surface for the sides of a person's head when the side wings are open, i.e. pivoted to form an angle with respect to the front surface of the back panel. Preferred embodiments are made of ABS plastic, are no more than about 1.5 inches thick in the closed position, no more than 12 inches long, weigh less than a pound, and are easy to attach to and remove from a seat or headrest. In some embodiments, the padding for the side wing panels and, optionally, a pad for said back panel, comprise a unit that fits over the side wing members and is held in place (for example, by an elastic seam) at the back of the side wing members near the axle.

On the back side of the back panel are one or more straps to secure the headrest to a seat back or to a headrest on a seat. The straps are preferably attached on one end to bars which are attached to, and spaced apart from one another, on the back side of the back panel. So attached, the straps preferably slide upwardly and downwardly on the bars to adjust the position of the headrest on a seat back or seat headrest.

At the end of each of the side wing members is an L-shaped, V-shaped or C-shaped offset that includes an axle. Preferably, this axle extends between flanges that attach to the two-sided panel at an angle in the range of about 85° to about 95°. In general, the offset is of sufficient size and shape to accommodate the thickness of the side wing members, whether padded or not, so that the side wing members can fold substantially flat against the front surface of the back panel. The side wing members, including the axle, offset portion, and the two-sided panel are preferably integrally formed or molded.

The headrest also includes, in preferred embodiments, one or two retainer members. Each retainer member holds one or two side wing members to the back side of the back panel, pivotably and foldably, with their axles positioned in hinge-forming grooves on the back side of the back panel. A counterpart, complementary hinge-forming groove (or two such grooves) on the surface of each retainer member (or on a single retainer member) holds the axle(s) in the hinge(s) formed by and between these two grooves. The axle on each side-wing member is free to pivot within such a hinge, thus permitting the side wing member to which the axle is joined to pivot from the open position to the closed, folded flat position. In preferred embodiments, each retainer member includes a hook or other flange that fits removably into a slot or other opening near the end of the back panel. When inserted into this slot or opening, the hook or flange holds the retainer member to the back side of the back panel, and holds the side wing member in the hinge groove. The retainer members also include one or more, preferably two, through holes to permit one or more screws to pass through, and thread into holes on the back side of the back panel, thus securing the retainer member to the back side of the back panel.

BRIEF DESCRIPTION OF THE DRAWINGS

The headrest of this invention can better be understood by reference to the drawings, which illustrate a preferred of the headrest. In the drawings.

DETAILED DESCRIPTION OF THE PREFERRED EMBODIMENT

Figure 1:
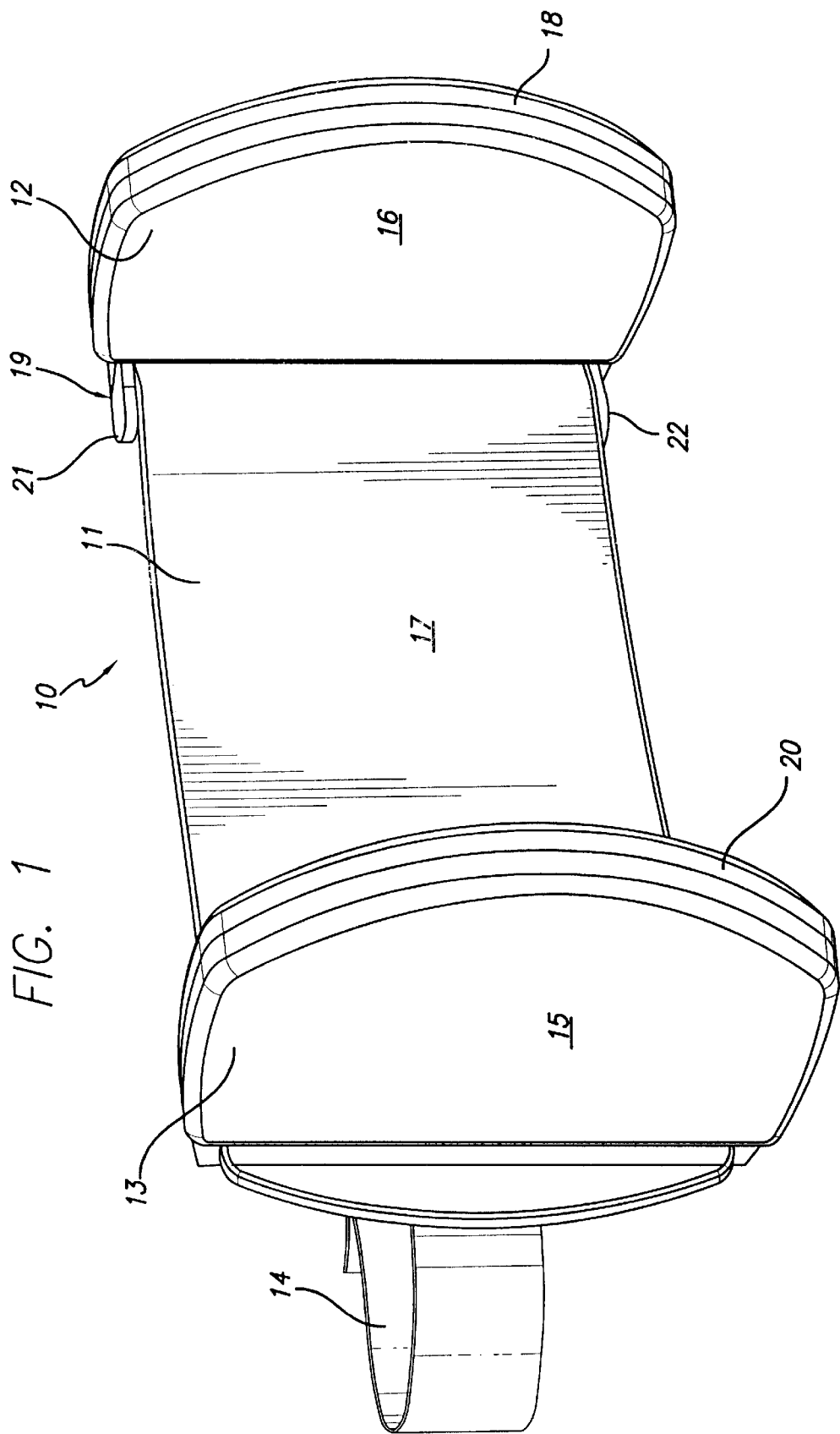
FIG. 1 is a front perspective view of a preferred embodiment of the headrest of this invention.
Figure 5:
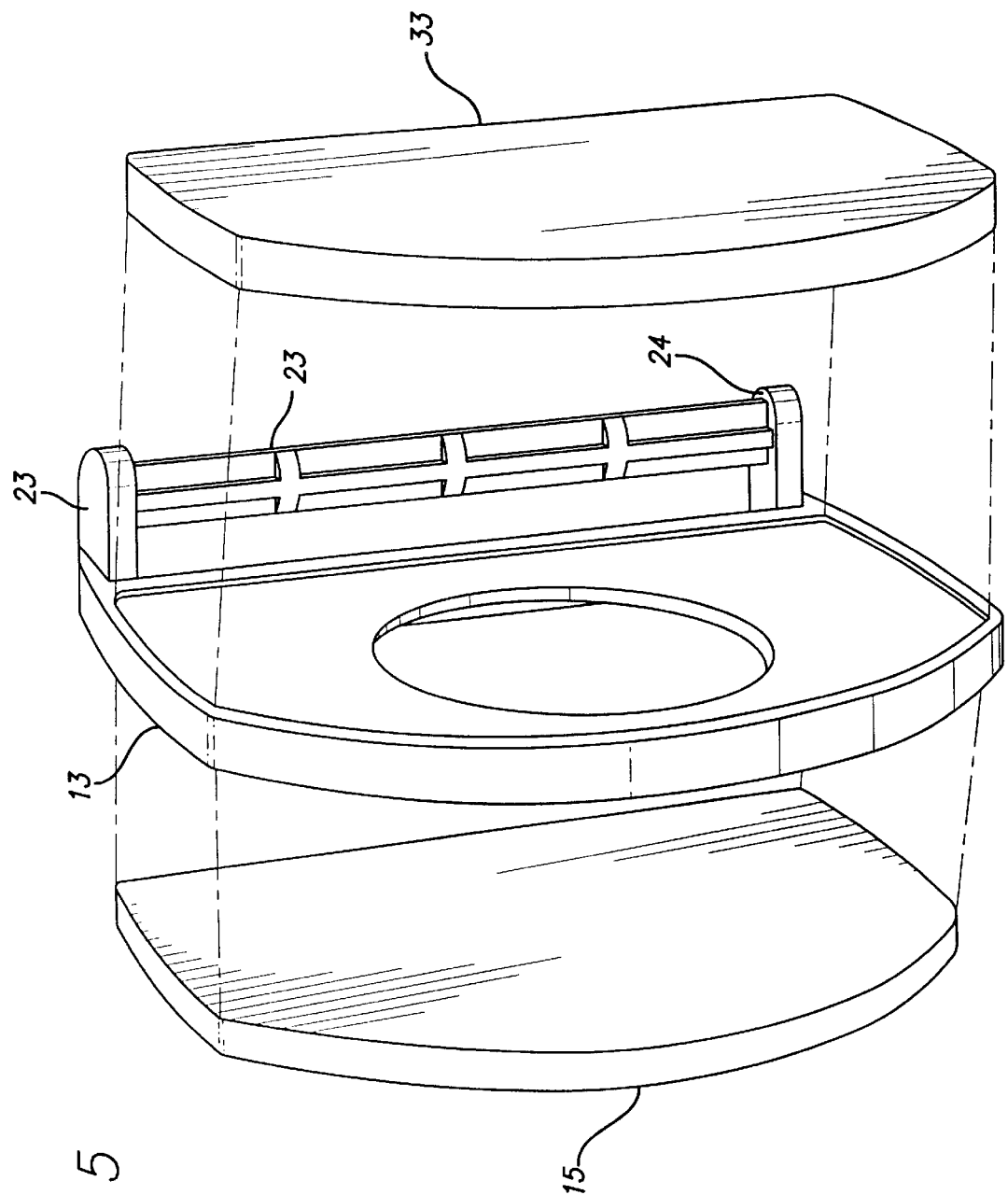
FIG. 5 shows an exploded perspective view of a side wing member of the headrest shown in FIGS. 1–4 with padding on each side of the side wing member separated from the panel to show the assembly of side wing member parts.

FIG. 1 shows headrest 10 including back panel 11 with contoured front surface 17 for support of the back of a person's head. Pivotably and foldably joined to back panel 11 are side wing members 12 and 13, each including a two-sided, substantially flat-surfaced panel. Side wing members 12 and 13 are identical to one another in size, shape, structure and function. Side wing member 12 includes padded inner surface 16 and rounded, contoured edge 18. FIG. 5 shows side wing member 13 with foam pads 33 and 15 separated from the two side member 13. Side wing member 13 includes rounded, contoured edge 20 and padded surface panel 15. Attached to, and integrally formed with side wing member 12 is offset 19, joined to side wing member 12 at an angle of about 90°. Offset member 19 includes flanges 21 and 22 with axle member 23 (see FIG. 3) integrally formed between them. Attached to the back side 31 of back panel 11 is adjustable strap 14.

Figure 2:
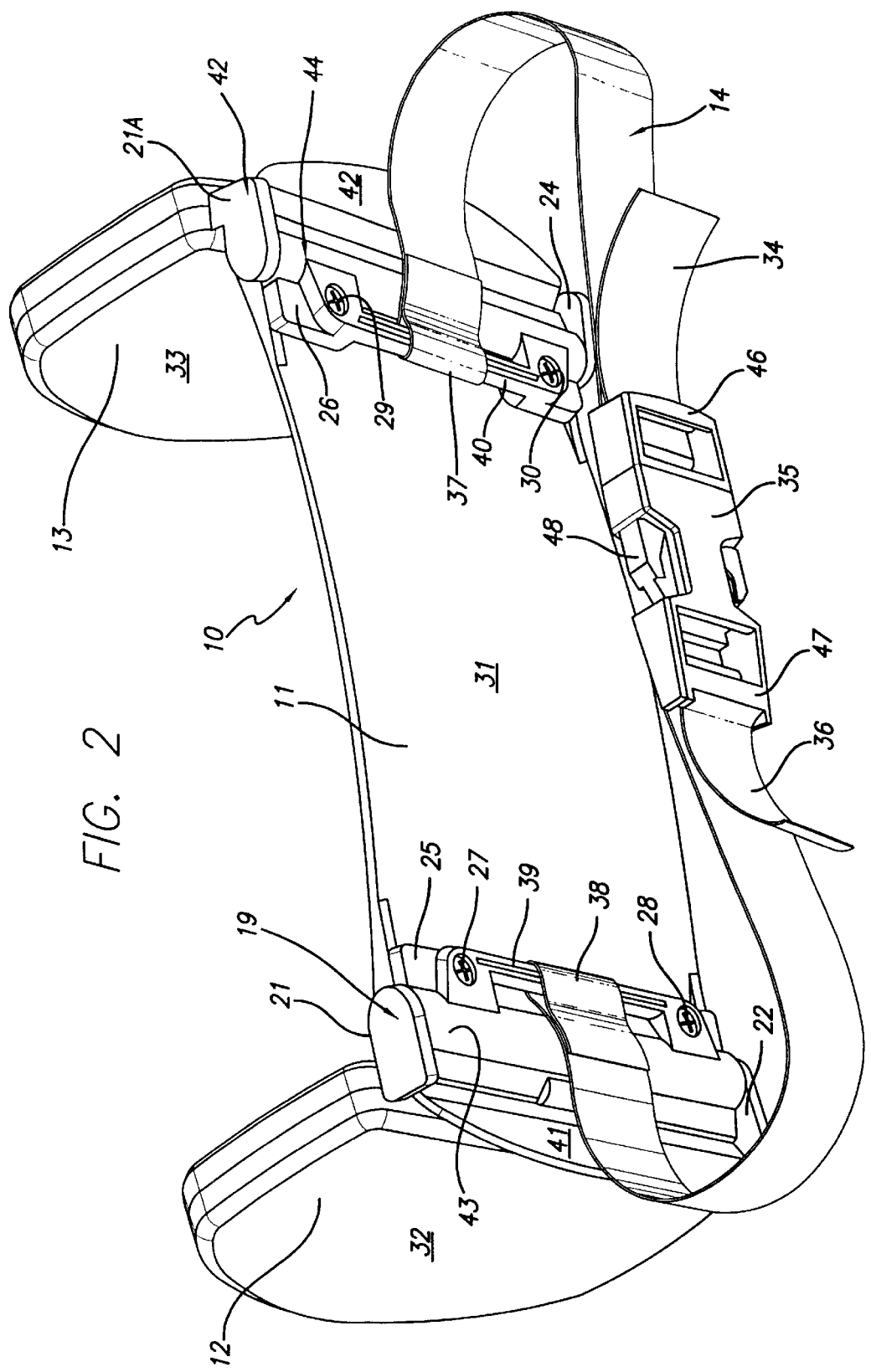
FIG. 2 is a rear perspective view of the headrest shown in FIG. 1.

FIG. 2 shows back side 31 of back panel 11. Retainer members 25 and 26 are attached to back side 31 by screws 27, 28 and screws 29, 30, respectively. Screws 27,28,29 and 30 pass through openings in retainer members 25 and 26 and thread into mating openings in the surface of back side 31. Retainer members 25 and 26 include integrally formed bar members 39 and 40. Strap 14 is attached to bars 39 and 40 by strap loops 38 and 37, respectively, which are free to slide upwardly and downwardly on bars 39 and 40. This movement permits upward and downward adjustment of headrest 10 to a desired position of attachment to a seat back or seat headrest.

FIG. 2 shows side wing members 12 and 13 in the open position, i.e. with side wing members 12 and 13 pivoted to form an internal angle between the front surface 17 of back panel 11, and the inside surfaces of side wing members 12 and 13, in the range of about 90° to about 100°, most preferably about 94°.

Each of side wing members 12 and 13 includes L-shaped offset portions 19 and 42. Offset portion 19 includes flanges 21 and 22 with axle member 23 extending between them (see FIG. 3). Likewise, side wing member 13 includes flanges 23A and 24 with an axle of the same size and shape as axle 23 integrally formed between them. These axles are free to rotate in hinges 43 and 44 formed by complementary mating grooves in retainer members 25 and grooves 26, and on the back side 31 of back panel 11 (see FIG. 3).

Back panel 11 includes angled end portions 41 and 42. Each forms an internal angle with respect to the back side 31 of panel 11 of about 170°. Front surface 45 on flange 41 forms a surface against which the L-shaped offset 19 of side wing member 12 rests in the opened position.

Figure 7:
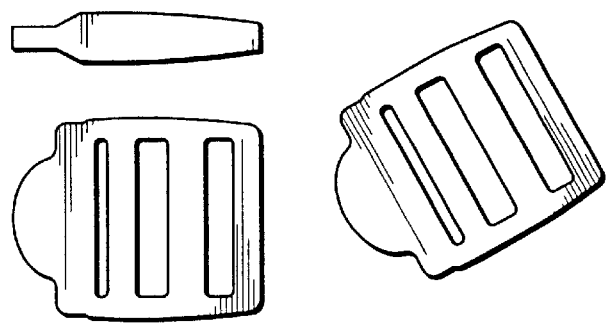
FIG. 7 is a perspective view of an alternative buckle for use with the strap attached to the headrest of FIGS. 1–6.

FIG. 2 also shows that strap 14 includes strap members 34 and 36. Strap portion 34 fits through buckle 46; strap member 36 fits through buckle 47. Buckles 46 and 47 join through bayonet clasp 48 of conventional design. Buckles such as the ladder type buckle shown in FIG. 7 can be used instead of the buckle shown in FIG. 2.

Figure 3:
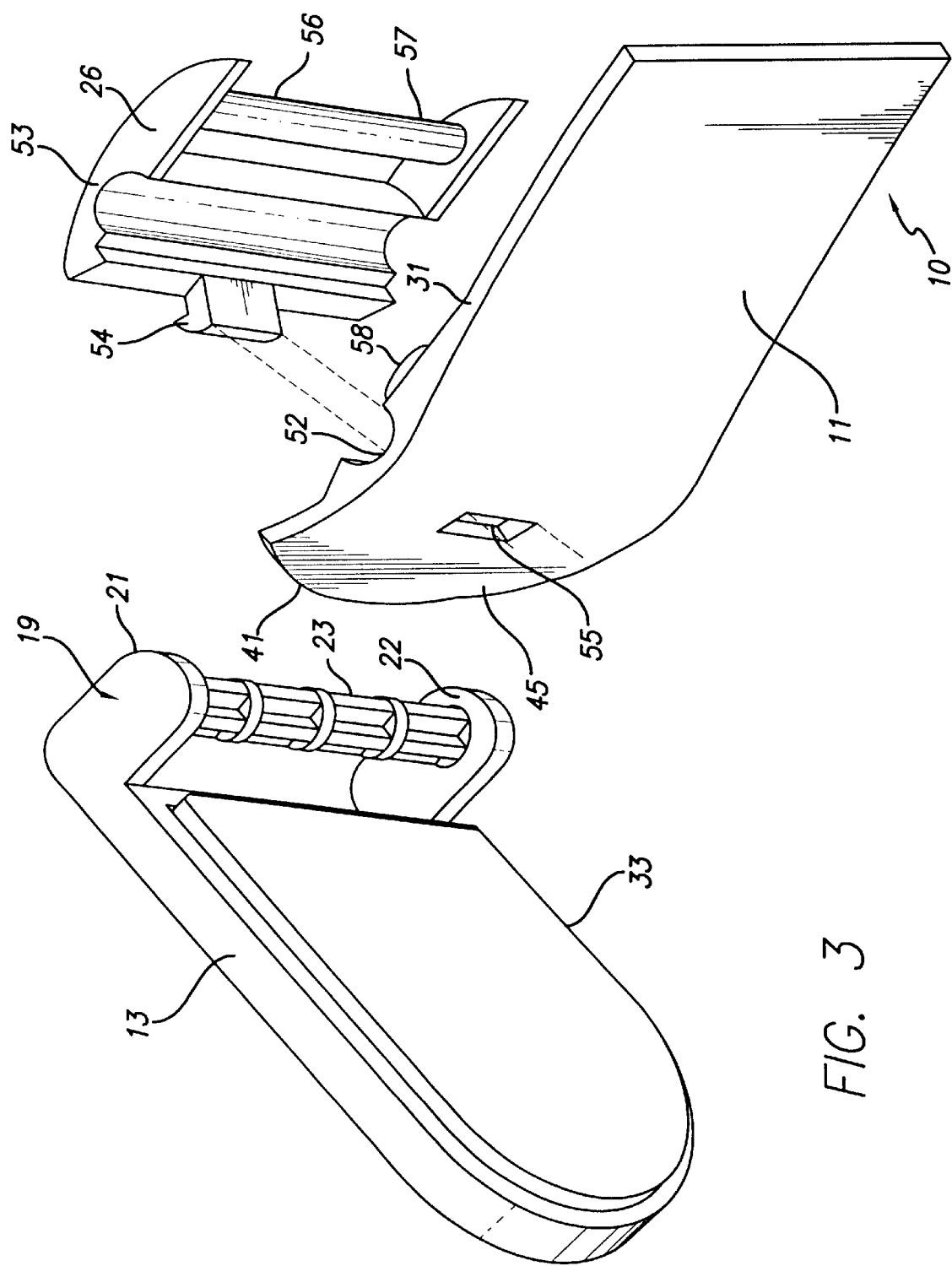
FIG. 3 is an exploded detailed view of a side wing member, retainer member and back panel that form part of the headrest shown in FIGS. 1–2.
Figure 4:
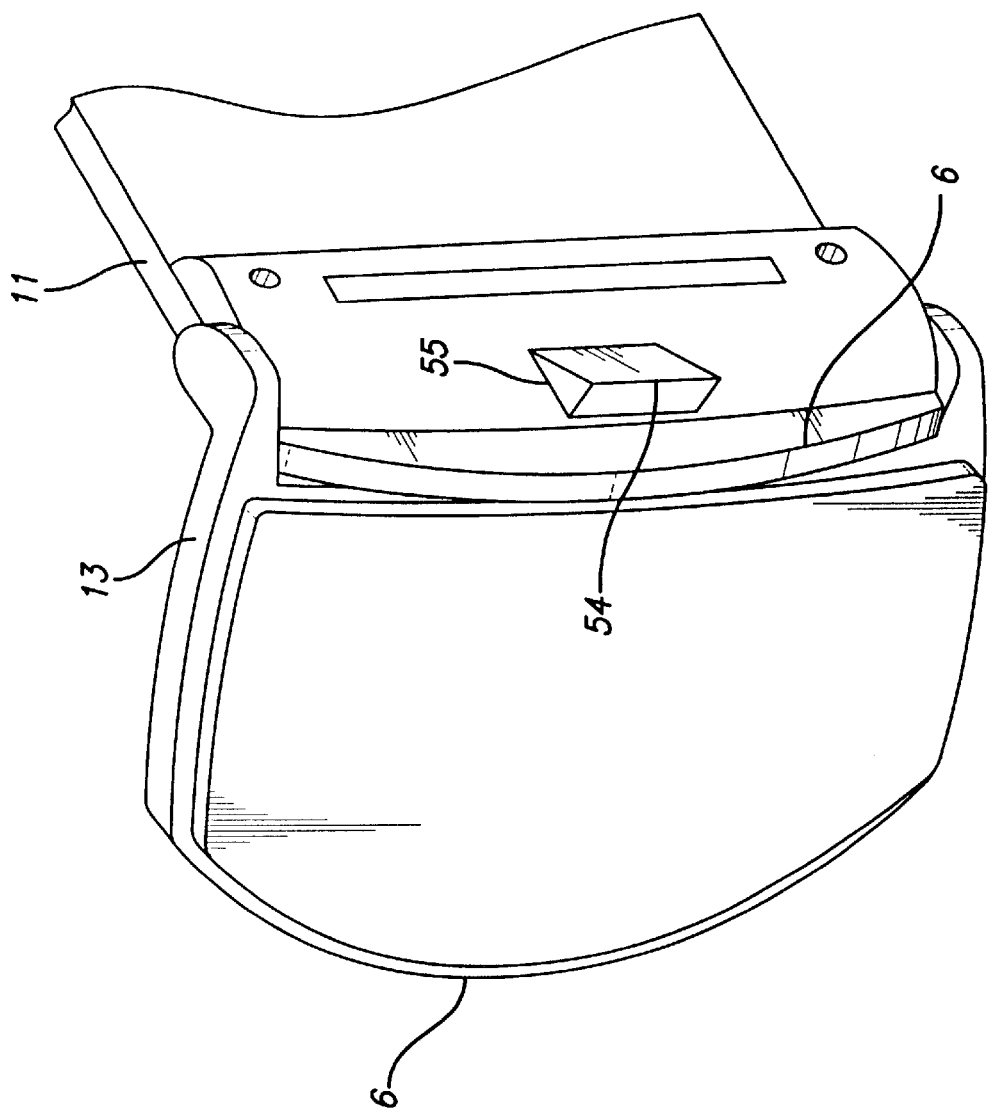
FIG. 4 is a detail of the perspective view of the headrest shown in FIGS. 1–3, with the side wing member, back panel and retainer member from FIG. 3 interconnected.
Figure 6:
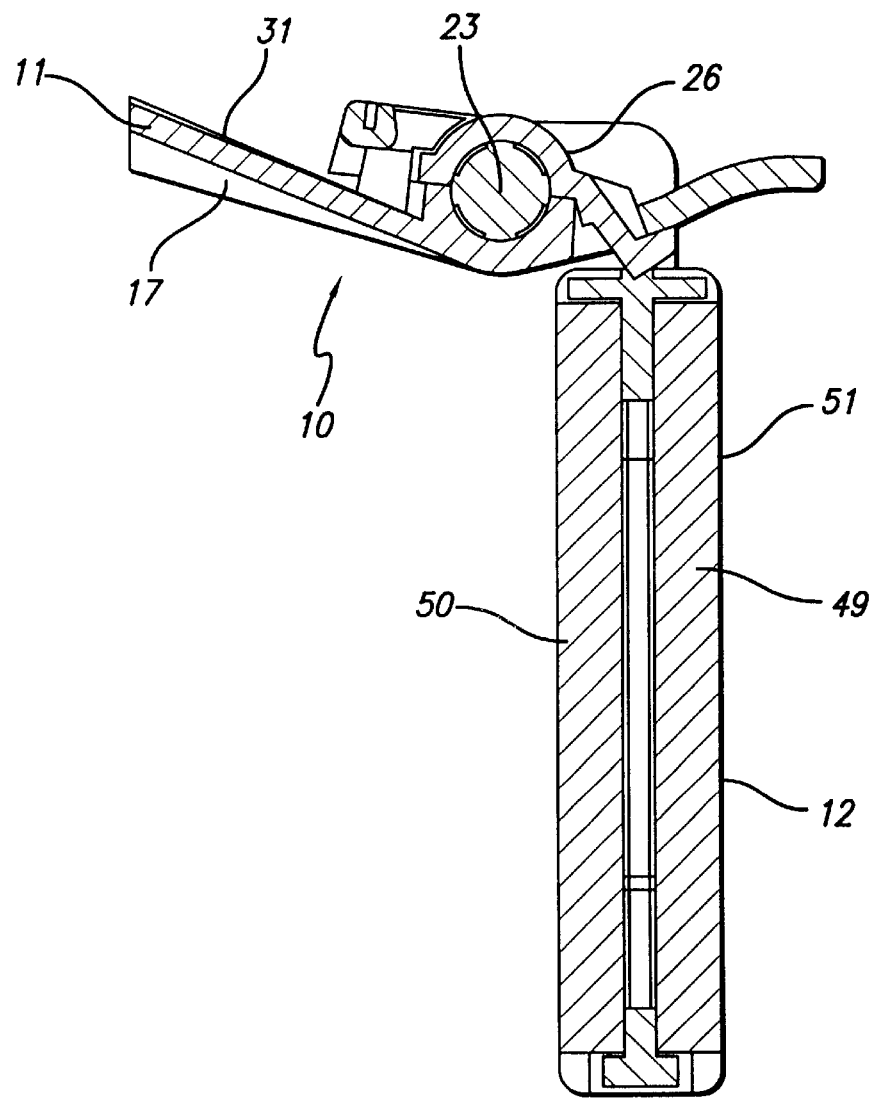
FIG. 6 is a cross-sectional view of a side wing member, taken on lines 6—6 in FIG. 4.

FIG. 3 shows side wing member 13, back panel 11 and retainer member 26 positioned for attachment to one another. Axle member 23 fits into groove 52 formed in its back side 31 of back panel 11. Retainer member 26 is then positioned with its complementary groove 53 over groove 52 to form a hinge for axle 23 between grooves 52 and 53. FIG. 6, taken on line 6—6 of FIG. 4, shows, in cross-section, axle 23 in the hinge formed between grooves 52 and 53. Retainer hook or flange 54 on retainer member 26 fits through slot 55 in back panel 11 to assist in holding retainer member 26 to the back surface 31 and back panel 11. See also FIG. 4. Openings 56 and 57 in retainer member 26 receive screws 29 and 30 which thread into complementary openings 58 and 59 (not shown) on the back side 31 of panel 11. These screws assist in holding retainer member 26 against the back side 31 and back panel 11. Side wing member 12 is attached to the opposite end of back panel 11 by retainer member 25, which has the same size, shape and function as retainer member 26.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. It is intended that the appended claims be construed to include alternative embodiments to the extent permitted by the prior art.

What is claimed is:

1. A headrest for supporting a person's head, said headrest comprising:
    a back panel adapted to abuttingly engage at least a back portion of a person's head, said back panel comprising a first hinge-forming groove at each end; and
    two side wing members pivotably and foldably attached to said back members at the ends of said back member, said members having a size and shape that permits said members to fold inwardly and substantially flat against the inside surface of said back panel, each of said members comprising an integrally-formed L-shaped, V-shaped or C-shaped offset portion including an axle that forms an angle in the range of about 85° C. to about 95° said axle being offset from the inner surface of said side wing member and rotatable in said hinge-forming groove.

2. The headrest of claim 1 further comprising a retainer member including a second hinge-forming groove complementary to said first hinge-forming groove, said first and second hinge-forming grooves forming a hinge when said retainer member is attached to the back side of said back panel.

3. The headrest of claim 1 wherein said side wing members are rotatable to an open position in which each side wing member forms an internal angle with respect to the front surface of said back panel in the range of about 90° to about 100°.

4. The headrest of claim 1 wherein said side wing members are pivotable to a position wherein said wing members lie substantially flat against the front surface of said back panel, said side wing members including padding on their outer surfaces that form a padded support surface for a person's head.

5. The headrest of claim 1 wherein said two side wing members are substantially the same in size, shape and function.

6. The headrest of claim 2 wherein each retainer member is substantially the same in size, shape and function.

7. The headrest of claim 2 wherein said headrest comprises said back panel, two identical side wing members, and two identical retainer members.

8. The headrest of claim 1 further comprising a slidable strap attached to the back side of said back panel, said slidable strap permitting slidable attachment of said headrest to a seat or to a seat headrest in a desired position.

* * * * *